US012665961B2

(12) United States Patent
Seo et al.

(10) Patent No.: US 12,665,961 B2
(45) Date of Patent: Jun. 23, 2026

(54) ELECTRONIC DEVICE INCLUDING SIDE KEY

(71) Applicant: Samsung Electronics Co., Ltd., Suwon-si (KR)

(72) Inventors: Dongjin Seo, Suwon-si (KR); Sungyoung Lee, Suwon-si (KR); Sunghyun Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 340 days.

(21) Appl. No.: 18/296,107

(22) Filed: Apr. 5, 2023

(65) Prior Publication Data

US 2023/0239381 A1 Jul. 27, 2023

Related U.S. Application Data

(63) Continuation of application No. PCT/KR2021/018335, filed on Dec. 6, 2021.

(30) Foreign Application Priority Data

| Dec. 4, 2020 | (KR) | ........................ | 10-2020-0168555 |
| Jan. 13, 2021 | (KR) | ........................ | 10-2021-0004518 |
| Apr. 22, 2021 | (KR) | ........................ | 10-2021-0052069 |

(51) Int. Cl.
*H04M 1/02* (2006.01)

(52) U.S. Cl.
CPC .................................. *H04M 1/026* (2013.01)

(58) Field of Classification Search
CPC ...... H04M 1/026; H04M 1/0277; H04M 1/18; H04M 1/236; H01H 13/063;

(Continued)

(56) References Cited

U.S. PATENT DOCUMENTS

| 8,542,482 B2 | 9/2013 | Hsiung |
| 9,529,391 B2 | 12/2016 | Ely |

(Continued)

FOREIGN PATENT DOCUMENTS

| CN | 204316589 U | 5/2015 |
| CN | 206313860 U | 7/2017 |

(Continued)

OTHER PUBLICATIONS

International Search Report dated Apr. 5, 2022, issued in International Patent Application No. PCT/KR2021/018335.

(Continued)

*Primary Examiner* — Jinsong Hu
*Assistant Examiner* — Rui M Hu
(74) *Attorney, Agent, or Firm* — Jefferson IP Law, LLP

(57) ABSTRACT

An electronic device including a side key is provided. The electronic device includes a housing including a first surface facing a first direction, a second surface facing a second direction opposite to the first direction, and a side part surrounding the space formed between the first surface and the second surface, and a side key coupled to the side part of the housing, wherein the side key includes a contact part exposed outside the housing through a through-hole formed from the side surface of the housing, and accommodation part formed in the side part of the housing, is connected to the through-hole, and includes an opening open from the inside of the housing in the first direction, a printed circuit board accommodated in the accommodation part and a cover bracket arranged in a third direction together with the contact part and the printed circuit board, and covers the opening.

12 Claims, 7 Drawing Sheets

(58) Field of Classification Search

CPC ........ H01H 2223/002; H01H 2231/022; G06F 1/16; H05K 5/00; H05K 5/03

See application file for complete search history.

(56) References Cited

U.S. PATENT DOCUMENTS

| | | | |
|---|---|---|---|
| 10,285,285 B2 | 5/2019 | Song et al. | |
| 10,341,472 B2 | 7/2019 | Guo | |
| 10,361,044 B1* | 7/2019 | Xydis | H01H 3/122 |
| 10,839,194 B2 | 11/2020 | Jung et al. | |
| 10,910,170 B2* | 2/2021 | Choi | H04M 1/0277 |
| 11,324,135 B2 | 5/2022 | Kim et al. | |
| 2010/0099468 A1* | 4/2010 | Huang | H04M 1/0237 |
| | | | 455/575.4 |
| 2011/0182047 A1* | 7/2011 | Ouyang | H04M 1/236 |
| | | | 361/679.01 |
| 2011/0228493 A1* | 9/2011 | Liang | H04M 1/236 |
| | | | 361/752 |
| 2017/0118319 A1* | 4/2017 | Jun | H04B 1/3833 |
| 2017/0245376 A1* | 8/2017 | Song | H01H 13/84 |
| 2018/0110143 A1* | 4/2018 | Zhao | G06F 1/1626 |
| 2018/0358190 A1* | 12/2018 | Lee | H04M 1/23 |
| 2019/0025888 A1 | 1/2019 | Chang et al. | |
| 2019/0080860 A1* | 3/2019 | Choi | H04M 1/236 |
| 2019/0371544 A1* | 12/2019 | Gu | H04M 1/026 |
| 2020/0050240 A1* | 2/2020 | Chen | H04M 1/236 |
| 2020/0267863 A1 | 8/2020 | Kim et al. | |
| 2021/0294387 A1 | 9/2021 | Fan | |
| 2022/0069443 A1 | 3/2022 | Jeon et al. | |
| 2023/0273651 A1* | 8/2023 | Li | H01H 13/85 |
| | | | 345/156 |

FOREIGN PATENT DOCUMENTS

| | | | |
|---|---|---|---|
| CN | 110320977 | A | 10/2019 |
| CN | 108648946 | B | 3/2020 |
| CN | 210297829 | U | 4/2020 |
| CN | 211828564 | U | 10/2020 |
| JP | 2019-513284 | A | 5/2019 |
| KR | 10-0957255 | B1 | 5/2010 |
| KR | 10-2013-0044454 | A | 5/2013 |
| KR | 10-2016-0081450 | A | 7/2016 |
| KR | 10-1674450 | B1 | 11/2016 |
| KR | 10-2017-0045090 | A | 4/2017 |
| KR | 10-2017-0099626 | A | 9/2017 |
| KR | 10-1830661 | B1 | 2/2018 |
| KR | 10-2018-0067858 | A | 6/2018 |
| KR | 10-2020-0092719 | A | 8/2020 |
| KR | 10-2020-0100294 | A | 8/2020 |
| KR | 10-2020-0101143 | A | 8/2020 |
| KR | 10-2022-0078441 | A | 6/2022 |

OTHER PUBLICATIONS

Korean Office Action dated May 9, 2025, issued in Korean Patent Application No. 10-2021-0052069.

Korean Notice of Allowance dated Jan. 1, 2026, issued in Korean Application No. 10-2021-0052069.

* cited by examiner

ELECTRONIC DEVICE INCLUDING SIDE KEY

CROSS-REFERENCE TO RELATED APPLICATION(S)

This application is a continuation application, claiming priority under § 365(c), of an International application No. PCT/KR2021/018335, filed on Dec. 6, 2021, which is based on and claims the benefit of a Korean patent application number 10-2020-0168555, filed on Dec. 4, 2020, in the Korean Intellectual Property Office, of a Korean patent application number 10-2021-0004518, filed on Jan. 13, 2021, in the Korean Intellectual Property Office, and of a Korean patent application number 10-2021-0052069, filed on Apr. 22, 2021, in the Korean Intellectual Property Office, the disclosure of each of which is incorporated by reference herein in its entirety.

BACKGROUND

1. Field

The disclosure relates to an electronic device including a side key.

2. Description of Related Art

Electronic devices may include at least one of a home appliance, a personal digital assistant (PDA), a portable multimedia player, a mobile communication terminal, a tablet personal computer (PC), an image/sound device, a desktop/laptop computer, or a car navigation system.

The electronic device may provide various functions, such as a calling function and a multimedia file playback function. A side key may be arranged on a side surface of the electronic device for performing various functions, such as volume control for phone conversation, volume control for multimedia file playback, or screen on/off while the aforementioned functions are performed.

When a contact part of the side key arranged on the side surface of the electronic device is pressed, the contact part of the side key is moved to the inside of the electronic device and a switch module that contacts the contact part of the side key is operated by the movement of the side key, generating an electric signal. The electric signal is sent to a processor mounted on a printed circuit board so that a function related to an input of the side key may be performed.

The above information is presented as background information only to assist with an understanding of the disclosure. No determination has been made, and no assertion is made, as to whether any of the above might be applicable as prior art with regard to the disclosure.

SUMMARY

A circuit board including a switch module may be accommodated in an accommodator of a side key. By the way, when the electronic device is dropped, the circuit board may break away and damage another component in the electronic device.

Aspects of the disclosure are to address at least the above-mentioned problems and/or disadvantages and to provide at least the advantages described below. Accordingly, an aspect of the disclosure is to provide an electronic device for preventing components around the side key from being damaged.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a first surface facing a first direction, a second surface facing a second direction opposite of the first direction, and a side portion enclosing space formed between the first surface and the second surface, and a side key coupled to the side portion of the housing, wherein the side key includes a contact part exposed to outside of the housing through a through hole formed on a side surface of the housing, an accommodator formed on the side portion of the housing and connected to the through hole, and including an opening open to the first direction from inside of the accommodator, a printed circuit board (PCB) accommodated in the accommodator, and a cover bracket arranged with the contact part and the PCB in a third direction and covering the opening to prevent the PCB from falling out of the opening.

According to various embodiments of the disclosure, a cover bracket arranged adjacent to a circuit board may be used to prevent components around a side key from being damaged.

In addition, according to various embodiments of the disclosure, various advantages figured out directly or indirectly may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 is a block diagram of an electronic device in a network environment according to an embodiment of the disclosure;

Throughout the drawings, it should be noted that like reference numbers are used to depict the same or similar elements, features, and structures.

DETAILED DESCRIPTION

Figure 2:
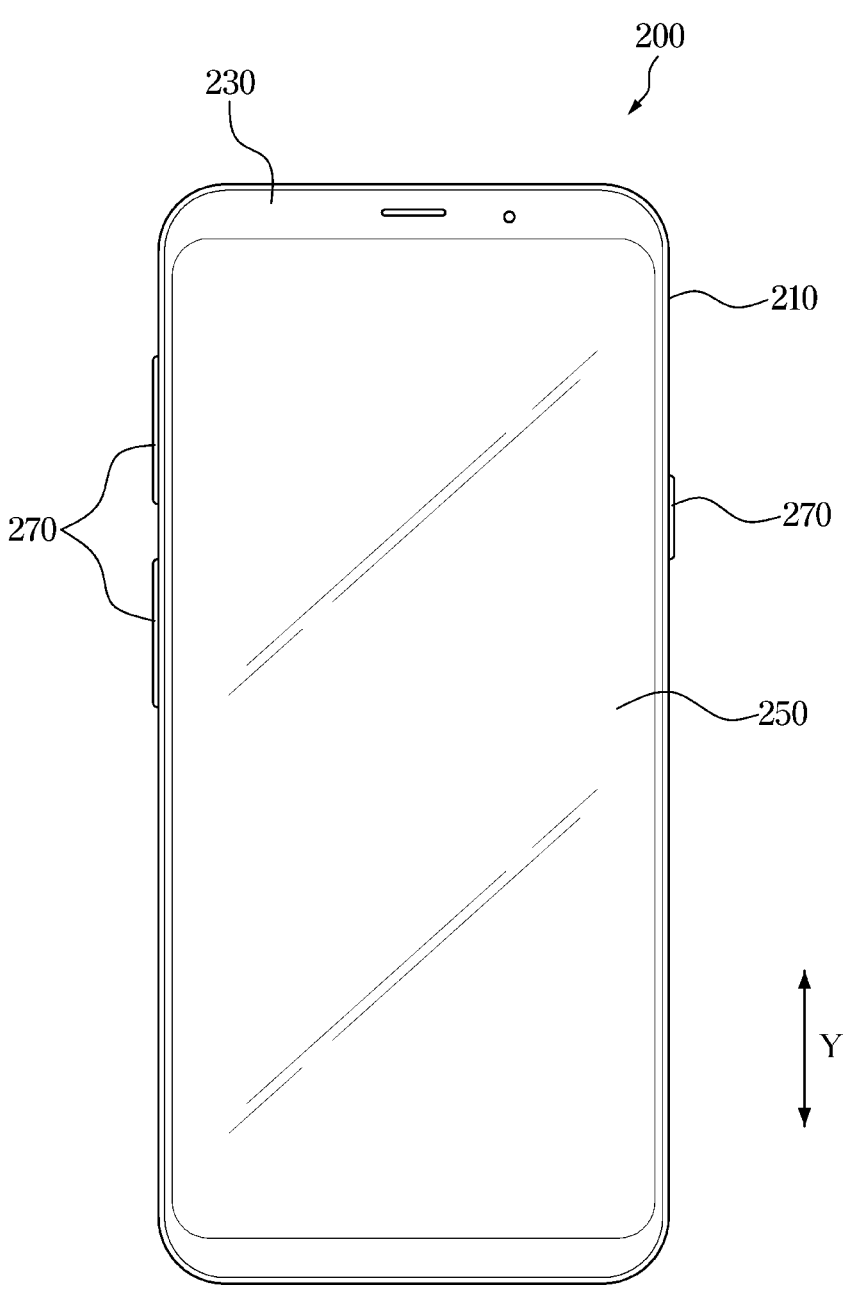
FIG. 2 illustrates an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
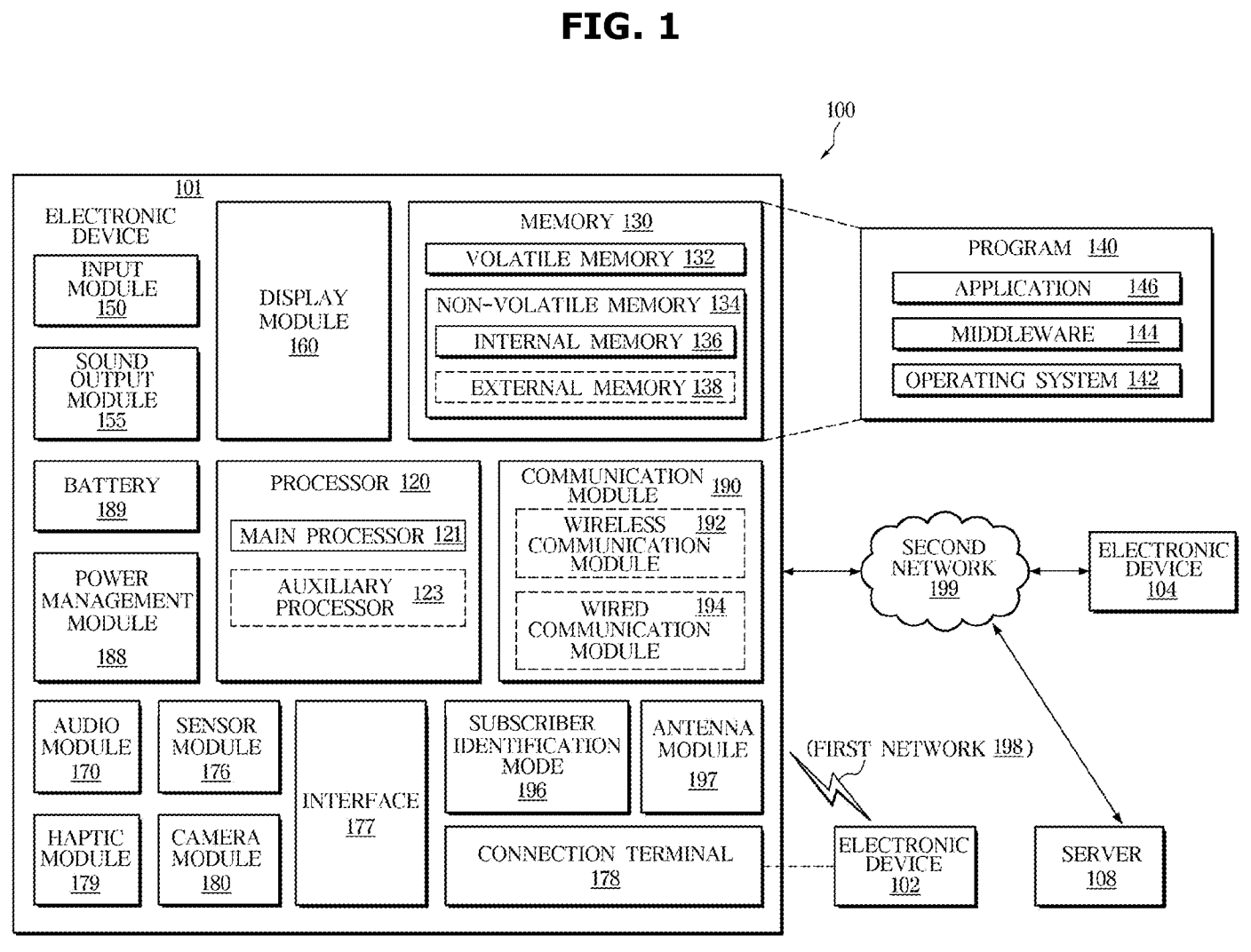

FIG. 1 is a block diagram of an electronic device in a network environment 100, according to an embodiment of the disclosure.

Referring to FIG. 1, an electronic device 101 in a network environment 100 may communicate with an external electronic device 102 via a first network 198 (e.g., a short-range wireless communication network), or communicate with at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module 196 or an antenna module 197. In an embodiment of the disclosure, at least one of the components (e.g., the connection terminal 178) may be omitted or one or more other components may be added to the electronic device 101. In an embodiment of the disclosure, some of the components (e.g., the sensor module 176, the camera module 180 or the antenna module 197) may be integrated into one component (e.g., the display module 160).

For example, the processor 120 may execute software (e.g., a program 140) to control at least one other component (e.g., hardware or software component) of the electronic device 101 and perform various data processing or computation. According to an embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resultant data in a non-volatile memory 134. In an embodiment of the disclosure, the processor 120 may include a main processor 121 (e.g., a central processing unit or an application processor) or an auxiliary processor 123 operable independently or together (e.g., a graphic processing unit, a neural processing unit (NPU), an image signal processor, a sensor hub processor, or a communication processor). For example, when the electronic device 101 includes the main processor 121 and the auxiliary processor 123, the auxiliary processor 123 may be configured to use lower power than the main processor 121 or specialize in a dedicated function. The auxiliary processor 123 may be implemented as separate from, or part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). In an embodiment of the disclosure, the auxiliary processor 123 (e.g., an image signal processor or a communication processor) may be implemented as part of another component (e.g., the camera module 180 or the communication module 190) functionally related thereto. In an embodiment of the disclosure, the auxiliary processor 123 (e.g., a neural network processing unit (NPU)) may include a hardware structure specialized in processing an artificial intelligence (AI) model. The AI model may be created by machine learning. Such learning may be performed by e.g., the electronic device 101 itself that performs the AI model, or may be performed by a separate server (e.g., the server 108). A learning algorithm may include e.g., supervised learning, unsupervised learning, semi-supervised learning, or reinforcement learning, without being limited thereto. The AI model may include a plurality of artificial neural network layers. The artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more of them, without being limited thereto. Additionally or alternatively, the AI model may include a software structure in addition to the hardware structure.

The memory 130 may store various data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system 142, middleware 144, or an application 146.

The input module 150 may receive a command or data to be used by a component (e.g., the processor 120) of the electronic device 101 from outside (e.g., a user) of the electronic device 101. The input module 150 may include, for example, a microphone, a mouse, a keyboard, a key (or button), or a digital pen (e.g., a stylus pen).

The sound output module 155 may output a sound signal to the outside of the electronic device 101. The sound output module 155 may include e.g., a speaker or a receiver. The speaker may be used for general purposes, such as multimedia playback or transcription playback. The receiver may be used to receive incoming calls. In an embodiment of the disclosure, the receiver may be implemented as separate from, or part of the speaker.

The display module 160 may visually provide information to the outside (e.g., a user) of the electronic device 101.

The display module 160 may include e.g., a display, a hologram device or a projector and a control circuit for controlling the device. In an embodiment of the disclosure, the display module 160 may include a touch sensor configured to detect a touch or a pressure sensor configured to measure intensity of force generated by the touch.

The audio module 170 may convert a sound to an electrical signal, or vice versa. In an embodiment of the disclosure, the audio module 170 may obtain a sound through the input module 150, or output a sound through the sound output module 155 or an external electronic device (e.g., the external electronic device 102) (e.g., a speaker or a headphone) connected directly or wirelessly to the electronic device 101.

The sensor module 176 may detect an operation condition (e.g., power or temperature) of the electronic device 101 or an external environment condition (e.g., a user condition), and create an electric signal or a data value corresponding to the detected condition. In an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more designated protocols to be used by the electronic device 101 to directly or wirelessly connect to an external electronic device (e.g., the external electronic device 102). In an embodiment of the disclosure, the interface 177 may include, for example, a high-definition multimedia interface (HDMI), a universal serial bus (USB) interface, a secure digital (SD) card interface, or an audio interface.

The connection terminal 178 may include a connector via which the electronic device 101 may be physically connected to the external electronic device (e.g., the external electronic device 102). In an embodiment of the disclosure, the connection terminal 178 may include, for example, an HDMI connector, a USB connector, an SD card connector, or an audio connector (e.g., a headphone connector).

The haptic module 179 may convert an electric signal into a mechanical stimulus (e.g., a vibration or motion) or electrical stimulus which may be recognized by a user via his tactile sensation or kinesthetic sensation. In an embodiment of the disclosure, the haptic module 179 may include, for example, a motor, a piezoelectric element, or an electric stimulator.

The camera module 180 may capture a still image and a moving image. In an embodiment of the disclosure, the camera module 180 may include one or more lenses, image sensors, image signal processors, or flashes.

The power management module 188 may manage electrical power supplied to the electronic device 101. In an embodiment of the disclosure, the power management module 188 may be implemented as e.g., at least part of a power management integrated circuit (PMIC).

The battery 189 may supply power to at least one component of the electronic device 101. In an embodiment of the disclosure, the battery 189 may include, for example, a primary cell which is not rechargeable, a secondary cell which is rechargeable, or a fuel cell.

The communication module 190 may support establishment of a direct (e.g., wired) communication channel or a wireless communication channel between the electronic device 101 and an external electronic device (e.g., the external electronic device 102, the external electronic device 104, or the server 108), and communication through the established communication channel. The communication module 190 may include one or more communication processors operated separately from the processor 120 (e.g., an application processor) and supporting direct (e.g., wired) communication or wireless communication. In an embodiment of the disclosure, the communication module 190 may include a wireless communication module 192 (e.g., a cellular communication module, a short-range wireless communication module or a global navigation satellite system (GNSS) communication module) or a wired communication module 194 (e.g., a local area network (LAN) communication module or a power-line communication module). A corresponding one of the communication modules may communicate with the external electronic device 104 over the first network 198 (e.g., a short-range communication network, such as Bluetooth™, wireless-fidelity (Wi-Fi) direct or infrared data association (IrDA)) or the second network 199 (e.g., a remote communication network, such as a legacy cellular network, a fifth generation (5G) network, a next generation communication network, the Internet, or a computer network (e.g., a LAN or wide area network (WAN)). These various types of communication modules may be integrated into a single component (e.g., a single chip) or implemented as a plurality of separate components (e.g., a plurality of chips). The wireless communication module 192 may use subscriber information (e.g., international mobile subscriber identity (IMSI)) stored in the subscriber identification module 196 to authorize or authenticate the electronic device 101 in the communication network, such as the first network 198 or the second network 199.

The wireless communication module 192 may support a 5G network after the 4G network and a next generation communication technology, e.g., a new radio (NR) access technology. The NR access technology may support high-speed transfer of high volume data (enhanced mobile broadband (eMBB)), minimization of user interface (UE) power and access of multiple UEs (massive machine type communication (mMTC)), or high reliability and low latency (ultra-reliable and low-latency communication (URLLC)). The wireless communication module 192 may support, e.g., high-frequency band (e.g., mmWave band) to attain a high data transfer rate. The wireless communication module 192 may support various technologies to guarantee performance in the high-frequency band, e.g., beamforming, massive multiple-input and multiple-output (MIMO), full dimensional MIMO (FD-MIMO), array antenna, analog beamforming, or large-scale antenna. The wireless communication module 192 may support various requirements prescribed for the electronic device 101, an external electronic device (e.g., the external electronic device 104) or a network system (e.g., the second network 199). In an embodiment of the disclosure, the wireless communication module 192 may support a peak data rate for fulfilling eMBB (e.g., 20 Gbps or higher), loss coverage for fulfilling mMTC (e.g., 164 dB or less), or user plane (U-plane) latency for fulfilling URLLC (e.g., 0.5 ms or less for downlink (DL) and uplink (UL) or 1 ms or less for round trip).

The antenna module 197 may transmit or receive a signal or power to or from the outside (e.g., to an external electronic device). In an embodiment of the disclosure, the antenna module 197 may include an antenna including a conductor or a radiator formed in a conductive pattern formed on a substrate (e.g., a printed circuit board (PCB)). In an embodiment of the disclosure, the antenna module 197 may include a plurality of antennas (e.g., array antennas). In this case, at least one antenna suitable for a communication scheme used in a communication network, such as the first network 198 or the second network 199, may be selected, for example, by the communication module 190 from among the plurality of antennas. The signal or power may be transmitted or received between the communication module 190 and the external electronic device through the at least one selected antenna. In an embodiment of the disclosure, a component (e.g., a radio frequency integrated circuit (RFIC)) other than the radiator may be additionally formed as part of the antenna module 197.

In various embodiments of the disclosure, the antenna module 197 may form an mmWave antenna module. In an embodiment of the disclosure, the mmWave antenna module may include a PCB, an RFIC arranged on or adjacent to a first surface (e.g., the lower surface) of the PCB to support a designated high-frequency band (e.g., mmwave band), and a plurality of antennas (e.g., array antennas) arranged on or adjacent to a second surface (e.g., the upper surface or side surface) of the PCB to transmit or receive a signal in the designated high-frequency band.

At least some of the components may be interconnected in an inter-peripheral communication method (e.g., a bus, a general-purpose input and output (GPIO), a serial peripheral interface (SPI), or a mobile industry processor interface (MIPI)) to exchange a signal (command or data) with one another.

In an embodiment of the disclosure, the command or data may be transmitted or received between the electronic device 101 and the external electronic device 104 through the server 108 connected to the second network 199. Each of the external electronic devices 102 or 104 may be a device of a same type as or a different type from the electronic device 101. In an embodiment of the disclosure, all or part of operations executed in the electronic device 101 may be executed in one or more of the external electronic devices 102, 104 or 108. For example, when the electronic device 101 needs to perform a function or service automatically or in response to a request from the user or another device, the electronic device 101 may request one or more of external electronic devices to perform the at least part of the function or service instead of or in addition to executing the function or service by itself. The one or more external electronic devices receiving the request may perform the at least part of the function or the service requested, or an additional function or service related to the request and send an outcome of the performing to the electronic device 101. The electronic device 101 may process the outcome as it is or in addition, and provide the result as part of a response to the request. For this, for example, cloud computing, distributed computing, mobile edge computing (MEC), or client-server computing technologies may be used. The electronic device 101 may use e.g., the distributed computing or mobile edge computing to provide an ultra-low latency service. In another embodiment of the disclosure, the external electronic device 104 may include an Internet of things (IoT) device. The server 108 may be an intelligent server that uses machine learning and/or a neural network. In an embodiment of the disclosure, the external electronic device 104 or the server 108 may be included in the second network 199. The electronic device 101 may be applied for intelligent services (e.g., smart home, smart city, smart car, or health care) based on the 5G communication technology and the IoT related technology.

An electronic device according to various embodiments of the disclosure may be various types of device. The electronic device may include, for example, a portable communication device (e.g., a smartphone), a computer device, a portable multimedia device, a portable medical device, a camera, a wearable device, or a home appliance. The electronic device according to embodiments of the disclosure is not limited to the aforementioned devices.

It is understood that various embodiments of the disclosure and associated terms are not intended to limit technical features herein to particular embodiments of the disclosure, but encompass various changes, equivalents, or substitutions. Like reference numerals may be used for like or related elements throughout the drawings. The singular form of a noun corresponding to an item may include one or more items unless the context states otherwise. Throughout the specification, "A or B", "at least one of A and B", "at least one of A or B", "A, B or C", "at least one of A, B and C", and "A, B, or C" may each include any one or all the possible combinations of A, B and C. Terms like "first", "second", etc., may be simply used to distinguish an element from another, without limiting the elements in a certain sense (e.g., in terms of importance or order). When an element is mentioned as being "coupled" or "connected" to another element with or without an adverb "functionally" or "operatively", it means that the element may be connected to the other element directly (e.g., wiredly), wirelessly, or through a third element.

In various embodiments of the disclosure, the term "module", "device", "member", or "block" may refer to a unit implemented in hardware, software, or firmware, and may be interchangeably used with e.g., logic, logic block, part, or circuit. The module may be an integral part that performs one or more functions, or a minimum unit or a portion of the part. For example, in an embodiment of the disclosure, the module may be configured with an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of a device (e.g., the electronic device 101) may call and execute at least one of the one or more instructions stored in the storage medium. This enables the device to be operated to perform at least one function according to at least one instruction called. The one or more instructions may include codes created by a compiler or codes that may be executed by an interpreter. The computer-readable storage medium may be provided in the form of a non-transitory storage medium. The term 'non-transitory storage medium' may mean a tangible device without including a signal, e.g., electromagnetic waves, and may not distinguish between storing data in the storage medium semi-permanently and temporarily.

In an embodiment of the disclosure, the aforementioned method according to the various embodiments of the disclosure may be provided in a computer program product. The computer program product may be a commercial product that may be traded between a seller and a buyer. The computer program product may be distributed in the form of a storage medium (e.g., a compact disc read only memory (CD-ROM)), through an application store (e.g., play store™), directly between two user devices (e.g., smart phones), or online (e.g., downloaded or uploaded). In the case of online distribution, at least part of the computer program product may be at least temporarily stored or arbitrarily created in a storage medium that may be readable to a device, such as a server of the manufacturer, a server of the application store, or a relay server.

In various embodiments of the disclosure, each of the aforementioned components (e.g., a module or a program) may include a single entity or multiple entities, and some of the multiple entities may be separately arranged in another component. In various embodiments of the disclosure, one or more of the aforementioned components or operations may be omitted, or one or more of other components or operations may be added. Alternatively or additionally, a plurality of components (e.g., modules or programs) may be integrated into a single component. In this case, the integrated component may perform one or more functions of the respective components therein equally or similarly to what are performed by the plurality of components before integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

In various embodiments of the disclosure, the electronic device may include at least one of a mobile communication terminal, a tablet personal computer (PC), or a wearable electronic device. The mobile communication terminal will be focused in the following description.

FIG. 2 illustrates an electronic device according to an embodiment of the disclosure.

Referring to FIG. 2, in one of various embodiments of the disclosure, an electronic device 200 (e.g., the electronic device 101 of FIG. 1) may include a housing 210, a front cover 230, a display 250 and/or a side key 270.

The housing 210 may include a first surface facing a first direction, a second surface facing a second direction opposite of the first direction, and a side portion enclosing space formed between the first surface and the second surface.

The housing 210 may secure and support components (e.g., the display 250 or a main printed circuit board (PCB) (not shown)) included in the electronic device 200. For example, the main PCB on which components, such as a processor, a memory, or a communication module are mounted may be safely seated and fixed to the inside of the housing 210. At least a portion of the housing 210 may include a conductive material.

The housing 210 may include a front surface, a rear surface, and a side surface enclosing at least a portion of the space between the front surface and the rear surface. The side surface may refer to a surface visually seen when a thin plane of the electronic device 200 is viewed; the front surface may refer to a surface, which is an area other than the side surface and on which a screen output through the display 250 is seen outside, the rear surface may refer to a surface opposite of the front surface. In an embodiment of the disclosure, a partial screen of the display 250 may be exposed to the outside through the rear surface and/or the side surface, but the majority area of the front surface may be arranged to output the screen of the display 250. Furthermore, the housing 210 may have at least one through hole 210b formed in a partial area of the side surface, and the side key 270 may be exposed to the outside through the through hole 210b.

The front cover 230 may form a front exterior of the electronic device 200, and may be coupled to the housing 210 with a space for receiving the internal components inside the housing 210. At least a portion of the front cover 230 may be formed of a transparent material (e.g., glass), and the screen output through the display 250 may be displayed outside through the transparent area of the front cover 230.

The display 250 (e.g., the display module 160 of FIG. 1) may be at least one of a liquid crystal display (LCD), a light emitting diode (LED) display, an organic LED (OLED) display, or a micro electromechanical system (MEMS) display. In an embodiment of the disclosure, the display 250 may be equipped with a touch panel to perform a touch screen function. The display 250 (e.g., the display module 160 of FIG. 1) may display various contents (e.g., text, images, video, icons, symbols or the like) for the user. The display 250 may include a touch screen which may receive touches, gestures, proximity or hovering inputs by way of e.g., an electronic pen or a body part of the user.

The side key 270 may provide an interface for user inputs. For example, when the user presses a button 271a (see FIG. 5) of the side key 270, a connector 271c (see FIG. 5) connected to the button and a pressurizer 271b (see FIG. 5) are moved to the inside of the housing 210, pressurizing a switch module 273b (see FIG. 5) and generating a key input signal (electrical signal) by the electrical contact. Accordingly, the electronic device 200 may perform a function related to the side key 270 in response to the key input signal. For example, the electronic device 200 may perform various functions, such as screen on/off, volume control of phone conversation, or volume control of multimedia file playback in response to the input of the side key 270.

The side key 270 may be arranged to be exposed to the outside through the through hole 210b formed on a side portion 210a of the housing 210. Although it is shown that the side key 270 is arranged in an edge region of the housing 210, the position of the arrangement of the side key 270 is not limited thereto. Furthermore, the button of the side key 270 may be provided in the singular or plural.

In an embodiment of the disclosure, the side key 270 may be mounted on one side surface of the housing 210, but may be arranged on a side surface or rear surface of the display 250 to avoid interference with the display 250 included in the electronic device 200. Although there are three side keys 270 shown on side surfaces of the housing 210, it is not limited thereto and the side key 270 may be arranged on the rear surface or there may be more than or less than three side keys.

Figure 3:
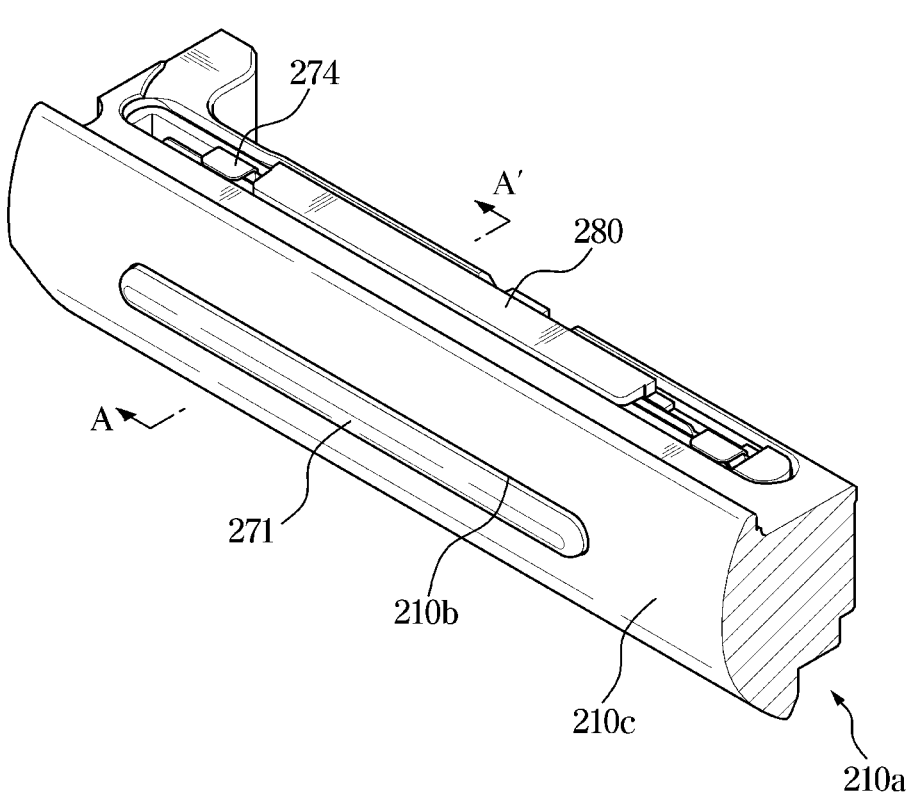
FIG. 3 is a perspective view of a side key of an electronic device according to an embodiment of the disclosure.
Figure 3:
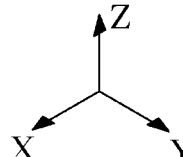

FIG. 3 is a perspective view of a side key of an electronic device according to an embodiment of the disclosure.

Figure 4:
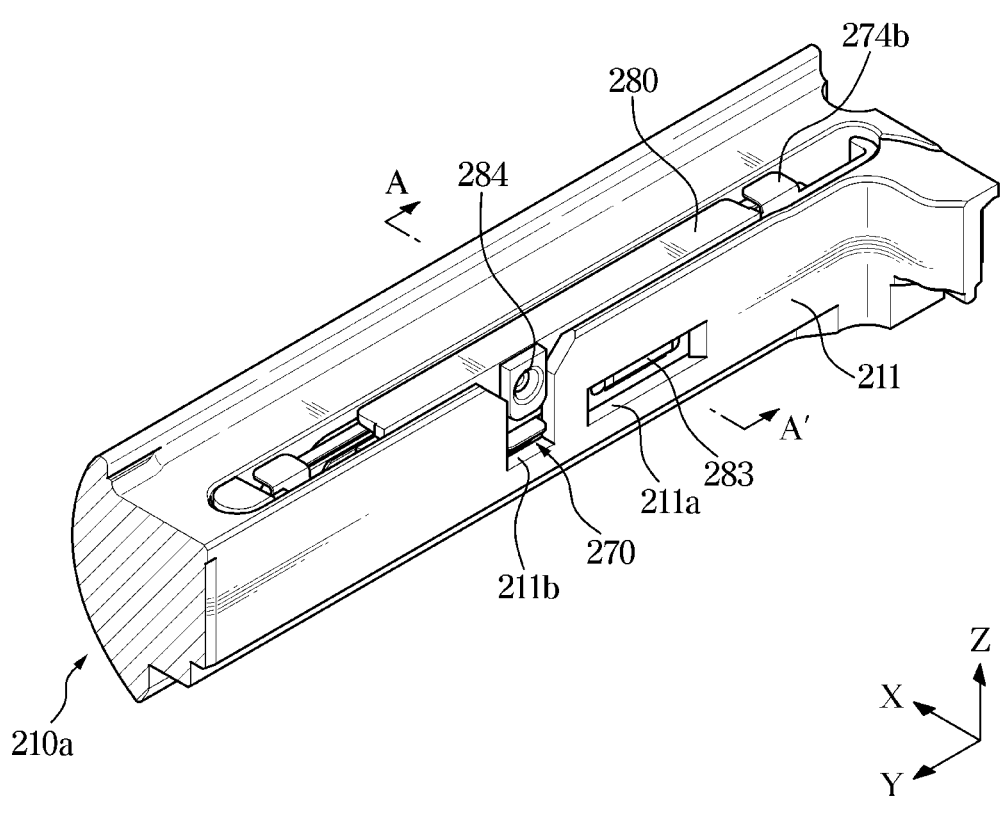
FIG. 4 is a perspective view of a side key of an electronic device according to an embodiment of the disclosure.

FIG. 4 is a perspective view of a side key of an electronic device according to an embodiment of the disclosure.

Referring to FIGS. 3 and 4, in one of various embodiments of the disclosure, the side key 270 may be arranged in the side portion 210a of the housing 210. For example, the side key 270 may be coupled with the side portion 210a of the housing 210. The side key 270 may include a contact part 271 exposed to the outside of the housing 210 through the through hole 210b formed on the side surface 210c of the housing 210, an accommodator 275 (see FIG. 5) formed on the side portion 210a of the housing 210, connected to the through hole 210b, and having an opening 275a (see FIG. 5) open to a first direction (e.g., direction Z) from inside of the accommodator 275, a PCB 273 (see FIG. 5) received in the accommodator 275, a cover bracket 280 arranged with the contact part 271 and the PCB 273 in a third direction (e.g., direction −X) and covering the opening 275a to prevent PCB 273 from falling out of the opening 275a, and a supporting plate 274 received in the accommodator 275 to support the PCB 273, and arranged between the PCB 273 and the cover bracket 280 in the third direction (e.g., the direction −X) when received in the accommodator 275. The supporting plate 274 may support the PCB 273 and/or a sealing member 272 (see FIG. 5).

One surface of the contact part 271 may be exposed to the outside through the through hole 210b bored in the side surface 210c of the housing 210. Accordingly, the one surface of the contact part 271 exposed to the outside may be pressed by the user. The one surface of the contact part 271 exposed to the outside may be the button 271a (see FIG. 5).

The contact part 271 may extend from the side surface 210c of the housing 210 to an inward direction of the housing 210, and at least a portion of the extension may be inserted to the through hole 210b. Furthermore, the at least a portion inserted to the through hole 210b may be moved in the direction –X of the housing 210 according to whether the user presses the contact part 271.

The cover bracket 280 may stably secure and support the PCB 273, which will be described later. In an embodiment of the disclosure, the cover bracket 280 may include a pair of supporters 287 (see FIG. 6) matching the length and width of the PCB 273 and facing each other. In an embodiment of the disclosure, the cover bracket 280 may be formed of a plastic material. For example, the cover bracket 280 may include a plastic substance to injection-mold the cover bracket 280. This may lighten the cover bracket 280, and allow the manufacturer to manufacture the cover bracket 280 in a desired shape.

The side key 270 may include an antenna (not shown). In an embodiment of the disclosure, the antenna may include one for 5G frequency band (e.g., 3.5 GHz or 28 GHz) communication. The antenna may be formed with an array antenna or a patch antenna.

The cover bracket 280 may be arranged inside the side portion 210a of the housing 210. For example, the cover bracket 280 may be arranged in the accommodator 275, which will be described later. The cover bracket 280 may cover the PCB 273 and/or the supporting plate 274 arranged in the accommodator 275. Specifically, the cover bracket 280 may prevent the PCB 273 and/or the supporting plate 274 from falling out to the second direction (e.g., the direction Z). For example, the cover bracket 280 may be arranged with the contact part 271 and the PCB 273 in the third direction (e.g., the direction –X), and may cover the opening 275a to prevent the PCB 273 from falling out of the opening 275a of the accommodator 275. This may protect the other components in the electronic device 200 from being damaged due to breakaway of the PCB 273 and/or the supporting plate 274.

One wall 211 of the housing 210 may form the accommodator 275 (see FIG. 5), which will be described later. A fastening hole 211a may be formed on the one wall 211 of the housing 210 for the cover bracket 280 to be coupled to the side portion 210a of the housing 210. The housing 210 may include a guide groove 211b on the one wall 211 of housing 210, which is sunken in the direction –Z. The guide groove 211b may guide the cover bracket 280 to be inserted to the accommodator 275 through a guide protrusion 284 of the cover bracket 280.

The pressurizer 271b (see FIG. 5) may pressurize the switch module 273b on the PCB 273. When the pressurizer 271b pressurizes the switch module 273b, an electric signal may be generated by the electrical contact. As the PCB 273 is electrically connected to the main PCB (not shown) arranged in the housing 210, the electric signal may be sent to the main PCB. For example, when the user presses the button 271a, the connector 271c and the pressurizer 271b connected to the button 271a pressurize the switch module 273b while moving into the housing 210, generating a key input signal (electric signal) by the electric contact.

Figure 5:
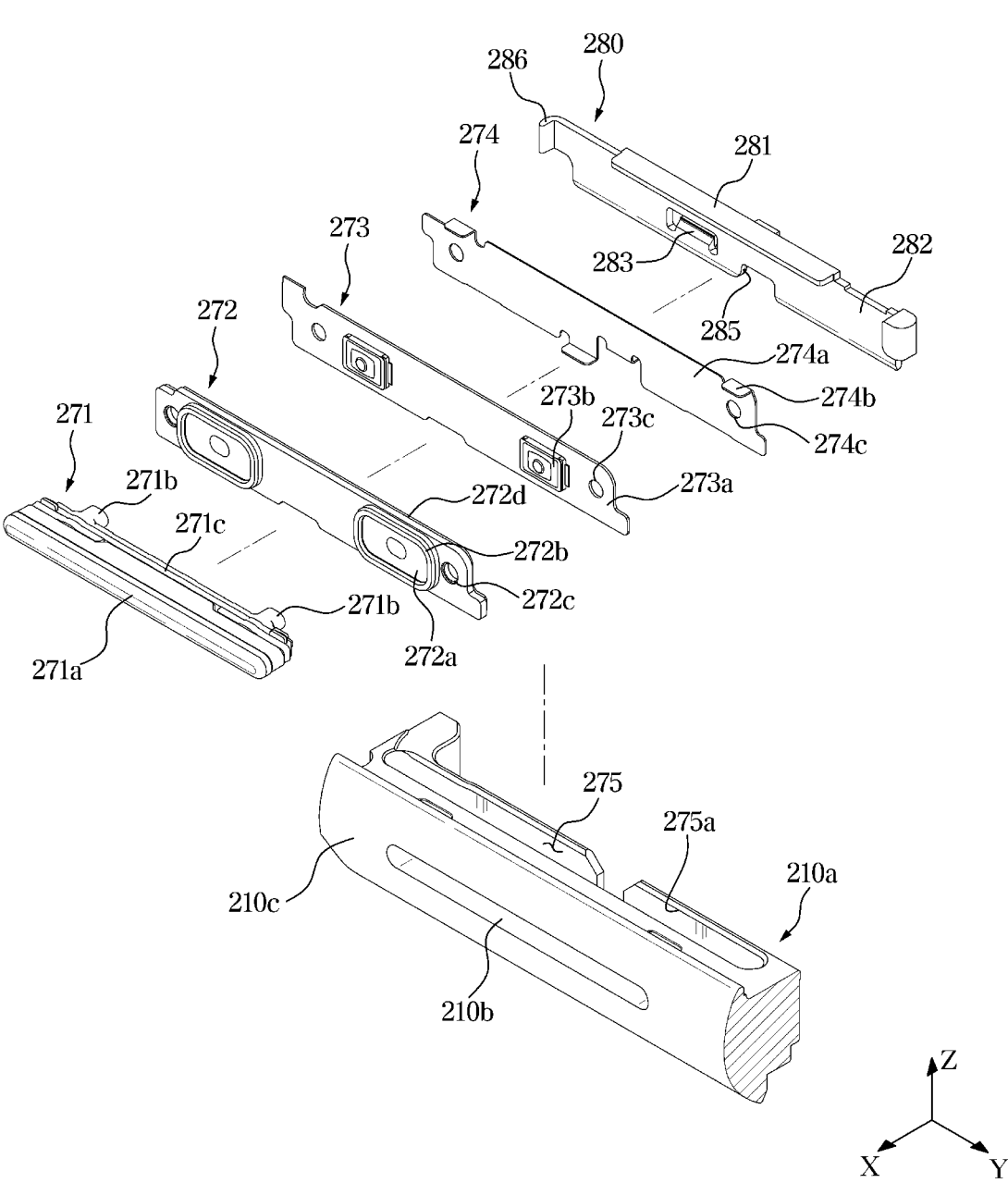
FIG. 5 is an exploded perspective view of a side key of an electronic device according to an embodiment of the disclosure.

FIG. 5 is an exploded perspective view of a side key of an electronic device according to an embodiment of the disclosure.

Figure 6:
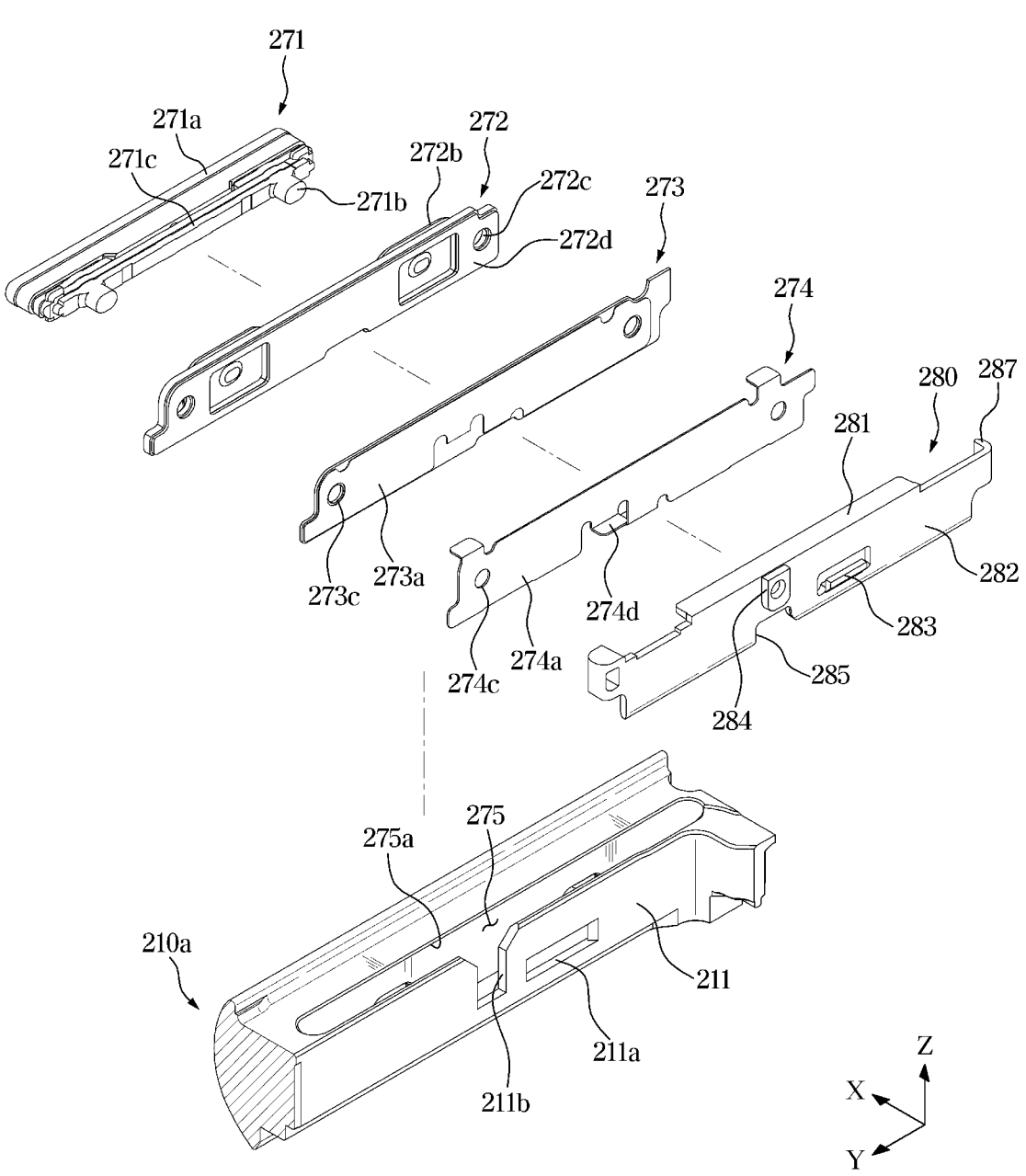
FIG. 6 is an exploded perspective view of a side key of an electronic device according to an embodiment of the disclosure.

FIG. 6 is an exploded perspective view of a side key of an electronic device according to an embodiment of the disclosure.

Referring to FIGS. 5 and 6, in one of various embodiments of the disclosure, the side key 270 may include the contact part 271, the sealing member 272, the PCB 273, the supporting plate 274, the accommodator 275, and the cover bracket 280.

The accommodator 275 may be formed in the side portion 210a of the housing 210. The accommodator 275 may be formed in the side portion 210a of the housing 210 and connected to the through hole 210b. The accommodator 275 may include the opening 275a open to the first direction (e.g., the direction Z) from inside of the accommodator 275. The sealing member 272, the PCB 273, the supporting plate 274, and the cover bracket 280, which will be described later, may be received in the accommodator 275. The components do not, however, need to be received in the accommodator 275, and some of the components may be omitted.

The accommodator 275 may be formed by the one wall 211 of the housing 210. The accommodator 275 may be sunken from the side portion 210a of the housing 210. For example, the accommodator 275 may be sunken from the side portion 210a of the housing 210 in the second direction (e.g., the direction –Z). The housing 210 may include the fastening hole 211a formed on the one wall 211 of the housing 210, which forms the accommodator 275. The housing 210 may also include the guide groove 211b formed on the one wall 211 of the housing 210, which forms the accommodator 275, to guide insertion of the cover bracket 280.

The contact part 271 may include the button 271a, the pressurizer 271b and the connector 271c.

The button 271a may be exposed to the outside of the housing 210 on the side surface 210c of the housing 210. Accordingly, when the user presses the button 271a, a signal may be sent to the PCB 273 arranged in the housing 210. At least a portion of the button 271a may be exposed to the outside of the housing 210 while the other portion may be placed in the through hole 210b. It is not, however, limited thereto, and the button 271a may be placed in any different position of the housing 210.

The connector 271c may be arranged between the button 271a and the pressurizer 271b. The connector 271c may be arranged in the through hole 210b for the force pressed on the button 271a to be conveyed to the pressurizer 271b. The connector 271c may extend in one direction between the button 271a and the pressurizer 271b. For example, the connector 271c may extend in the direction X.

The pressurizer 271b may extend from the connector 271c in the direction –X. In an embodiment of the disclosure, there may be two pressurizers 271b arranged. The pressurizer 271b may be formed to match a pressed surface 272a of the sealing member 272. The number, shape or position of the pressurizer 271b is not limited to the above example, and there may be different numbers, shapes or positions of the pressurizers 271b.

The sealing member 272 may be arranged between the contact part 271 and the PCB 273. The sealing member 272 may seal a gap between the contact part 271 and the PCB 273 to protect the electronic device 200 against water. For example, even when water is brought in through the side portion 210a of the housing 210, the sealing member 272 may prevent the water from flowing to the PCB 273.

The sealing member 272 may include the pressed surface 272a, a forming protrusion 272b, a hole 272c and/or a coupling plate 272d. The pressed surface 272a may be pressed by the pressurizer 271b. A physical signal may be transferred to the switch module 273b through the pressed surface 272a. The pressed surface 272a may protect the switch module 273b from being damaged even when the physical force is too strong. The pressed surface 272a may be a sealing portion 272a. The forming protrusion 272b may be formed around the pressed surface 272a to form the pressed surface 272a. The forming protrusion 272b may protrude from one surface of the sealing member 272 in a direction toward the contact part 271. For example, the forming protrusion 272b may protrude in the direction X. The coupling plate 272d may support and/or secure the sealing portion 272a from one side of the sealing portion 272a.

The PCB 273 may be arranged between the sealing member 272 and the supporting plate 274. The PCB 273 may receive an electric signal when the contact part 271 is pressed, and send the electric signal to the main PCB in the housing 210. For example, the PCB 273 may be electrically connected to the main PCB.

The PCB 273 may include a circuit part 273a on which a circuit pattern is formed, the switch module 273b connected to the contact part 271 according to whether the contact part 271 is pressed and/or a hole 273c. The switch module 273b may receive a signal from the pressurizer 271b.

The supporting plate 274 may be arranged on a side to the PCB 273 to support and/or secure the PCB 273. The supporting plate 274 may be received in the accommodator 275 to support the PCB 273. When received in the accommodator 275, the supporting plate 274 may be positioned between the PCB 273 and the cover bracket 280 in the third direction (e.g., the direction −X). The supporting plate 274 may be inserted to the accommodator 275 in the second direction (e.g., the direction −Z).

The supporting plate 274 may include a supporter 274a, a hole 274c, and a plurality of couplers 274b and 274d. The supporter 274a may support the PCB 273 from one side of the PCB 273. The plurality of couplers 274b and 274d may be formed on both ends of the supporter 274a in the direction Z or −Z. The plurality of couplers 274b and 247d may include a first coupler 274b and a second coupler 274d. The first coupler 274b may protrude from one end in the direction Z of the supporter 274a in the direction X. The second coupler 274d may protrude from the other end in the direction Z of the supporter 274a in the direction −X. The second coupler 274d may be formed to match a recess 285 formed on the cover bracket 280.

The cover bracket 280 may be arranged in the accommodator 275 to prevent the PCB 273 and/or the supporting plate 274 from falling out of the accommodator 275. The cover bracket 280 may be arranged with the contact part 271 and the PCB 273 in the third direction (e.g., the direction −X) and may cover the opening 275a to prevent the PCB 273 from falling out of the opening 275a. Furthermore, the cover bracket 280 may fill the empty space of the accommodator 275, and may thus prevent movement of the PCB 273 and/or the supporting plate 274.

The cover bracket 280 may include a cover part 281 to cover the opening 275a, an extension 282 bending from the cover part 281 and extending from an end of the cover part 281 in the second direction (e.g., the direction −Z), a fastening protrusion 283 protruding from the extension 282 in the third direction (e.g., the direction −X) to be inserted to the fastening hole 211a, and the guide protrusion 284 protruding from the extension 282 to be inserted to the guide groove 211b. The cover bracket 280 may include the recess 285 and the supporter 287.

The cover part 281 may be formed on one side of the extension 282. The cover part 281 may cover the opening 275a. For example, the cover part 281 may cover at least a portion of the opening 275a. The cover part 281 may prevent the supporting plate 274 and the PCB 273 from falling out of the accommodator 275. The cover part 281 may extend from one end of the extension 282. For example, the cover part 281 may extend from one end in the direction Z of the extension 282 toward the direction X. This may prevent the supporting plate 274 and/or the PCB 273 from falling out of the accommodator 275 through the opening 275a and prevent the peripheral component (e.g., the display 250) from being damaged.

The extension 282 may extend from one end of the cover part 281. For example, the extension 282 may extend from one end in the third direction (e.g., the direction −X) of the cover part 281 to the second direction (direction −Z). The extension 282 may be arranged in the accommodator to fill the empty space of the accommodator 275. Accordingly, the PCB 273 and/or the supporting plate 274 may be prevented from being moved in the accommodator 275.

The fastening protrusion 283 may protrude from the extension 282 to the third direction (e.g., the direction −X) to be fastened with the fastening hole 211a formed on the one wall 211 that forms the accommodator 275. As the fastening protrusion 283 is fastened with the fastening hole 211a, the cover bracket 280 may not be detached from the side portion 210a of the housing 210. This will be described below.

The guide protrusion 284 may protrude from the extension 282 to the third direction (e.g., the direction −X). The guide protrusion 284 may be formed to match the guide groove 211b formed on the one wall 211. When the cover bracket 280 is inserted to the accommodator 275, the guide groove 211b and the guide protrusion 284 may guide a direction of insertion of the cover bracket 280 to prevent the cover bracket 280 from falling out in the direction Y or −Y. The recess 285 may be formed to match the second coupler 274d arranged on the supporting plate 274. The supporter 287 may match the length and width of the PCB 273 and may be formed in one pair facing each other.

Figure 7:
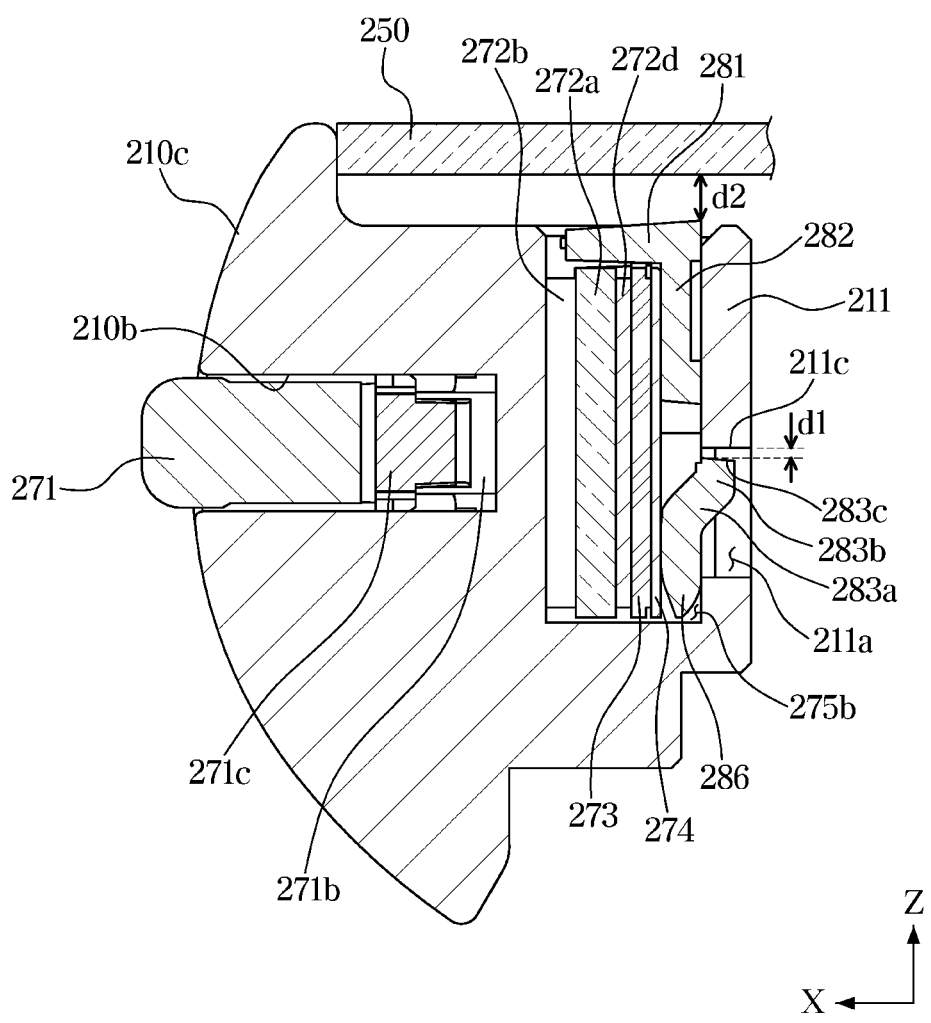
FIG. 7 is a cross-sectional view of a side key of an electronic device according to an embodiment of the disclosure.

FIG. 7 is a cross-sectional view of a side key of an electronic device according to an embodiment of the disclosure. FIG. 7 is a cross-sectional view of the side portion 210a shown in FIG. 3 cut along line A-A'.

Referring to FIG. 7, in one of various embodiments of the disclosure, the side key 270 may be arranged on the side portion 210a of the housing 210.

The contact part 271 may be exposed to the outside through the through hole 210b. For example, the button 271a may be exposed to the outside of the housing 210. Accordingly, the button 271a exposed to the outside may be pressed by the user. When the button 271a is pressed, a physical signal may be transferred to the sealing member 272 through the connector 271c and the pressurizer 271b. The physical signal transferred to the sealing member 272 may be delivered to the PCB 273. On receiving the physical signal, the PCB 273 may convert the physical signal to an electric signal and send the electric signal to the main PCB (not shown) arranged in the housing 210. In other words, the contact part 271 may extend in the inward direction of the housing 210 from the side surface 210c of the housing 210.

Furthermore, the contact part 271 may be moved in the direction –X of the housing 210 according to whether the user pressurizes the contact part 271.

The sealing member 272, the PCB 273, the supporting plate 274, and/or the cover bracket 280 may be arranged in the accommodator 275. The cover bracket 280 may cover the opening 275*a* open to the first direction (e.g., the direction Z) from inside of the accommodator 275. For example, the cover part 281 may cover the opening 275*a*. The cover part 281 may prevent the sealing member 272, the PCB 273, the supporting plate 274 and/or the cover bracket 280 from falling out of the accommodator 275. Referring to FIG. 7, when at least one of the sealing member 272, the PCB 273, the supporting plate 274 or the cover bracket 280 falls out of the accommodator 275, it may damage the display 250. However, as the cover bracket 280 covers the opening 275*a* to prevent at least one of the sealing member 272, the PCB 273, the supporting plate 274 or the cover bracket 280 from falling out of the accommodator 275, the display 250 may not be damaged. The display 250 is merely an example, but other components in the electronic device may also be prevented from being damaged.

In an embodiment of the disclosure, the cover bracket 280 may be inserted to the accommodator 275 in the second direction (e.g., the direction –Z). Furthermore, the supporting plate 274 may be inserted to the accommodator 275 in the second direction (e.g., the direction –Z). When received in the accommodator 275, the supporting plate 274 may be positioned between the PCB 273 and the cover bracket 280 in the third direction (e.g., the direction –X). The supporting plate 274 may be inserted to the accommodator 275 in the second direction (e.g., the direction –Z), and the cover bracket 280 may be inserted to the accommodator 275 after the supporting plate 274 is inserted. Accordingly, the cover bracket 280 may prevent the supporting plate 274 from falling out of the accommodator 275 with the cover part 281 arranged on one side of the supporting plate 274.

The cover bracket 280 may include the fastening protrusion 283. The fastening protrusion 283 may prevent the cover bracket 280 from falling out of the accommodator 275. The fastening protrusion 283 may protrude from the extension 282 in the third direction (e.g., the direction –X) to be inserted to the fastening hole 211*a*. For example, the fastening protrusion 283 may be inserted to the fastening hole 211*a* to prevent the cover bracket 280 from falling out of the accommodator 275 even when the electronic device 200 is shaken or shocked. The fastening protrusion 283 may be formed by using a T-cut tool. Accordingly, the fastening protrusion 283 is formed without a new component or structure, thereby increasing productivity and/or economic feasibility.

The fastening protrusion 283 may include a tilted portion 283*a* slopingly protruding from the extension 282 toward the fastening hole 211*a* to be inserted to the fastening hole 211*a*, and a stopper 283*b* extending from the tilted portion 283*a* to face one surface 211*c* of the one wall 211 that forms the fastening hole 211*a*. The tilted portion 283*a* and the stopper 283*b* may extend in the first direction (e.g., the direction Z). One surface 283*c* arranged at one end of the stopper 283*b* in the direction Z may face the one surface 211*c* that forms the fastening hole 211*a*.

For example, the electronic device may further include the display 250 coupled to one side of the housing 210 in the first direction (e.g., the direction Z), and a distance d2 between the cover part 281 and the display 250 may be larger than a distance d1 between the one surface 211*c* of the one wall 211 and the stopper 283*b*. Accordingly, even when the electronic device is dropped and e.g., a circuit board breaks away, the one surface 283*c* of the stopper 283*b* may come into contact with the one surface 211*c* that forms the fastening hole 211*a* before the cover part 281 of the cover bracket 280 damages another component (e.g., display 250) in the electronic device. Eventually, damage to the other component (e.g., the display 250) in the electronic device may be prevented or reduced.

In an embodiment of the disclosure, the accommodator 275 may include a seat portion 275*b* formed at one end in the second direction (e.g., the direction –Z) of the accommodator 275, and the cover bracket 280 may further include an inserted portion 286 arranged at one end in the second direction (e.g., the direction –Z) of the extension 282 and rounded to be inserted to the seat portion 275*b*. As the inserted portion 286 is formed by being rounded, the cover bracket 280 may be more easily inserted to the accommodator 275.

With the cover bracket 280, the side key 270 may fill the space in the accommodator 275 and prevent a component, such as the PCB 273 from falling out of the accommodator 275 without need for additional component in the housing 210. Various advantages may be gained with one component and no further component is required, thereby improving economic feasibility. Furthermore, the cover bracket 280 may be implemented in various forms by injection molding, thereby reducing the cost of materials, and may be less likely to be deteriorated, thereby minimizing the influence to neighboring components, such as antennas (not shown). For example, as the cover bracket 280 is implemented by injection molding, it may give less influence to communication performance of the antenna(s).

The side key 270 including the cover bracket 280 in various embodiments of the disclosure may be mounted in various positions. For example, the side key 270 may be placed not only on the side surface 210*c* of the housing 210 but also on the first surface, which is the front surface, or the second surface, which is the rear surface.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing including:
      a first surface facing a first direction,
      a second surface facing a second direction opposite to the first direction, and
      a side portion formed between the first surface and the second surface; and
   a side key coupled to the side portion of the housing,
   wherein the side key includes:
      a contact part exposed to outside of the housing through a through hole formed in a partial area of a side surface,
      an accommodator formed on the side portion of the housing and connected to the through hole, and including an opening configured to open to the first direction from inside of the accommodator,
      a printed circuit board (PCB) accommodated in the accommodator, and
      a cover bracket arranged with the contact part and the PCB in a third direction and covering the opening to prevent the PCB from falling out of the opening, wherein the housing includes:

a fastening hole formed on one wall of the housing, which forms the accommodator, and wherein the cover bracket includes:

a cover part configured to cover the opening, an extension bending from the cover part and extending from one end of the cover part in the second direction, a fastening protrusion protruding from the extension in the third direction to be inserted to the fastening hole and having a hooked end portion configured to be caught in the fastening hole so as to restrict movement of the cover bracket in a direction opposite to a direction in which the cover bracket is inserted into the accommodator, and a supporting plate disposed in the accommodator, the supporting plate including a plurality of couplers wherein at least one of the plurality of couplers is formed to have a shape corresponding to a recess formed in the cover bracket.

2. The electronic device of claim 1, wherein the cover bracket is arranged in the accommodator.

3. The electronic device of claim 1, wherein the fastening protrusion includes:

a tilted portion slopingly protruding from the extension toward the fastening hole to be inserted to the fastening hole; and a stopper extending from the tilted portion to face one surface of the one wall which forms the fastening hole.

4. The electronic device of claim 3, wherein the tilted portion and the stopper extend in the first direction.

5. The electronic device of claim 3, further comprising:

a display coupled to a side of the housing in the first direction, and wherein a distance between the cover part and the display is larger than a distance between the one surface of the one wall and the stopper.

6. The electronic device of claim 1, wherein the cover bracket is inserted to the accommodator in the second direction.

7. The electronic device of claim 6, wherein the supporting plate is accommodated in the accommodator to support the PCB, and wherein, when accommodated in the accommodator, arranged between the PCB and the cover bracket in the third direction.

8. The electronic device of claim 7, wherein the supporting plate is inserted to the accommodator in the second direction, and wherein the cover bracket is inserted to the accommodator after the supporting plate is inserted.

9. The electronic device of claim 1, wherein the housing includes:

a guide groove formed on one wall of the housing and configured to form the accommodator to guide insertion of the cover bracket, and wherein the cover bracket includes:

a cover part configured to cover the opening, an extension bending from the cover part and extending from one end of the cover part in the second direction, and a guide protrusion protruding from the extension to be inserted to the guide groove.

10. The electronic device of claim 9, wherein the cover bracket is inserted to the accommodator in the second direction.

11. The electronic device of claim 1, wherein the accommodator includes a seat portion formed at one end of the accommodator in the second direction, and wherein the cover bracket further includes an inserted portion arranged at one end of the extension in the second direction and rounded to be inserted to the seat portion.

12. The electronic device of claim 1, wherein the cover bracket includes a plastic material to be injection molded.

* * * * *